United States Patent [19]

Urbanavage et al.

[11] Patent Number: 6,099,954
[45] Date of Patent: Aug. 8, 2000

[54] POLISHING MATERIAL AND METHOD OF POLISHING A SURFACE

[75] Inventors: Walter J. Urbanavage, Drexel Hill; Heinz F. Reinhardt, Chadds Ford, both of Pa.

[73] Assignee: Rodel Holdings, Inc., Wilmington, Del.

[21] Appl. No.: 09/327,795

[22] Filed: Jun. 8, 1999

Related U.S. Application Data

[63] Continuation of application No. 08/977,940, Nov. 24, 1997, abandoned, which is a continuation of application No. 08/427,751, Apr. 24, 1995, abandoned.

[51] Int. Cl.$^7$ .................................................. B24D 17/00
[52] U.S. Cl. .................................... 428/314.2; 428/317.9; 51/308
[58] Field of Search ............................... 428/304.4, 317.9, 428/314.2; 51/308

[56] References Cited

U.S. PATENT DOCUMENTS

| 4,466,218 | 8/1984 | Ottman et al. ........................ 51/395 |
| 4,579,564 | 4/1986 | Smith ................................... 51/293 |

*Primary Examiner*—Elizabeth M. Cole
*Attorney, Agent, or Firm*—Konrad Kaeding; Hilmar Fricke; Kenneth A. Benson

[57] ABSTRACT

A polishing pad for polishing hard surfaces such as glass and silicon wafers and a method of polishing using such a polishing pad.

7 Claims, 1 Drawing Sheet

POLISHING MATERIAL AND METHOD OF POLISHING A SURFACE

This patent application is a Continuation of patent application Ser. No. 08/977,940 filed Nov. 24, 1997, now abandoned, which is a Continuation of patent application Ser. No. 08/427,751 filed Apr. 24, 1995, now abandoned.

FIELD OF THE INVENTION

This invention relates to sheet and pad material for polishing hard surfaces and to a method of polishing.

BACKGROUND OF THE INVENTION

In the manufacture of products from hard substances such as glass, nickel, silicon and ceramics, for many uses it is necessary to provide the products with one or more high precision polished surfaces. This may be done by abrading and/or polishing one or more of the products' surfaces. An example of such products is silicon wafers sliced from monocrystalline silicon ingots.

Silicon wafers are the substrates upon which integrated circuits are built. Their surfaces must be highly polished and as free from roughness as possible. To achieve this state, after being cut from a monocrystalline ingot the wafer top surface is lapped, chemically etched and subsequently polished to the desired degree.

The polishing process, to which the present invention relates, conventionally has consisted of two stage polishing. In the first stage, stiff pads such as "Suba" polishing pads made by Rodel, Inc., are used in conjunction with an aqueous dispersion of fine particles (slurry) to remove significant silicon stock from the top surface, leaving a noticeable topography, or roughness on the wafer surface. Typically the surface at the end of the first stage of polishing will exhibit a root mean square (rms) roughness of approximately 300 Angstroms.

Conventionally, in the final stage of polishing softer finishing pads, such as "Politex" polishing pads made by Rodel, Inc., are used in conjunction with a polishing slurry to remove any residual defects from the high areas of the wafer top surface. After final polishing the wafer surface must be extremely smooth, exhibiting a reduced Root Mean Square (rms) roughness normally of less than 10 Angstroms.

Typically roughness is determined on a very fine scale, e.g. via a 2 micron by 2 micron scan area using Atomic Force Microscopy (AFM). However, significant variations in topography may exist over a much larger scale than can be measured by this technique. Such large scale roughness is generally termed "texture" Currently, no generally accepted method for measuring texture exists in the silicon industry. The most widely used qualitative tool is Nomarski microscopy. A need exists for an improved polishing technique, i.e. one that will polish a silicon wafer so that it exhibits no visible texture when viewed by Nomarski microscopy at 50× magnification.

The pads conventionally used in the first stage of polishing, the stock removal stage, are non-woven fabric impregnated by in-situ coagulated elastomer, such as a polyurethane. Abrasive filler may be incorporated in the fibrous pad. Budinger, et al. U.S. Pat. No. 4,927,432 describes such pads. These pads are designed for rapid stock removal without consideration of the resultant wafer surface texture.

The type of pad conventionally used in the final stage of polishing is a fabric substrate coated with a cellular layer of coagulated elastomer, such as a polyurethane. The pad has a soft suede-like surface with a cellular structure that is open at the surface of the pad, enhancing the transport of the polishing slurry to the wafer surface. In this step the wafer microroughness is significantly reduced preparing the surface for subsequent integrated circuit manufacture. The production of such material to make such a pad is described in Hulsiander, et al., U.S. Pat. No. 3,284,274.

During the initial period of the second polishing step, the softness of the conventional final polishing pad causes it to conform to the surface being polished, making elimination of microroughness relatively easy. However, the softness generally results in a nearly complete inability to remove texture. Thus, a desirable second or final polishing pad would be one that can simultaneously remove texture while creating a low microroughness surface.

While silicon has been discussed, similar processes and problems are encountered with the polishing of a variety of other materials including glass, ceramics and nickel.

SUMMARY OF THE INVENTION

This invention relates to polishing sheet material and a polishing pad that are particularly useful in polishing hard surfaces such as glass, ceramics, nickel and silicon. The polishing sheet material, or polishing layer, is an elastomeric polymer with an open enlongated cellular structure that is free of non-porous fibrous material adjacent the polishing surface. The walls of the cellular structure contain dispersed finely divided particulate material. The particulate material modifies the cell wall properties. The polishing pad comprises a flexible backing layer having such a polymeric polishing layer affixed to the backing layer. This invention also relates to a method of polishing using a polishing layer of the present invention.

BRIEF DESCRIPTION OF THE DRAWINGS

To illustrate the invention there is shown in the drawings a polishing layer and a polishing pad form that is presently preferred, comprising a preferred polishing layer.

Specifically, the drawing is an enlarged elevation representing a vertical slice through layers of a typical polishing pad of present invention.

DETAILED DESCRIPTION OF THE PREFERRED EMBODIMENTS

Figure 1:
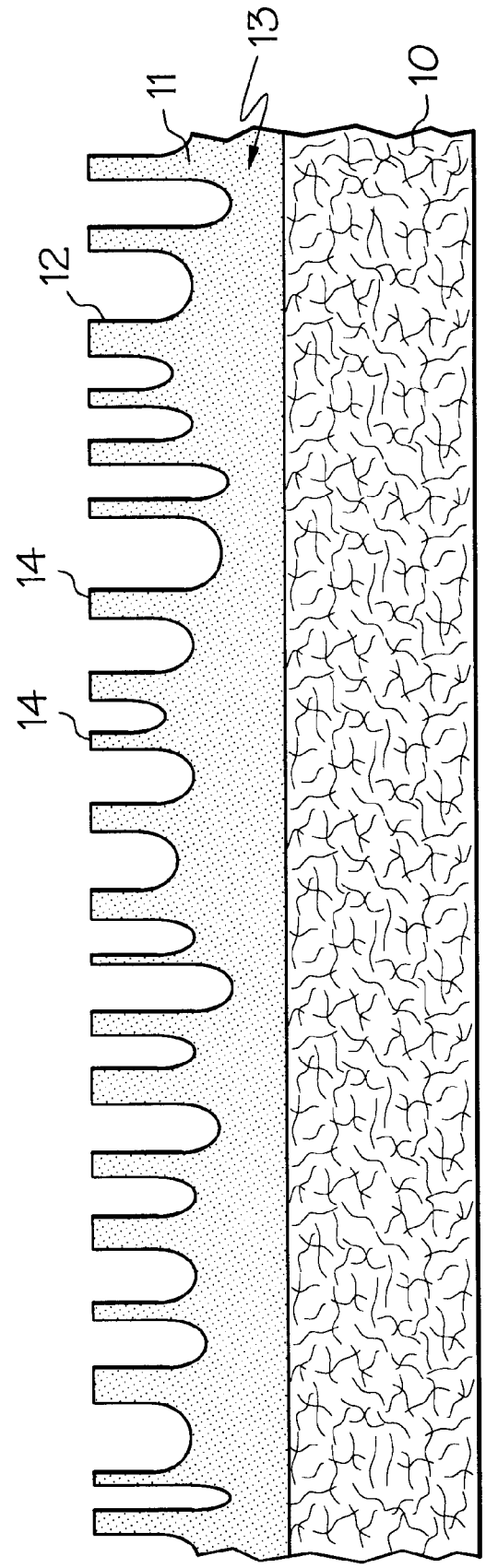

It has been found that greatly improved polishing is obtainable using a polishing layer comprising an elastomeric polymer polishing layer having an open cellular structure substantially free of non-porous fibrous material adjacent the polishing surface that would contact the surface being polished. The elastomeric cellular structure walls have dispersed therein finely divided particulate material that has a modulus of rigidity greater than that of the elastomeric polymer and so increases the modulus of rigidity of the cell walls. Polishing a hard surface in the conventional manner but using such a polishing pad enables an exceedingly low texture to be achieved, which is not achieved by conventional pads.

Elastomeric polymers conventionally used in polishing layers are used in making the polishing surface polymeric layer of the present invention pads. Such polymers are formed into the desired porous open cellular structure by the conventional solvent- nonsolvent coagulation process such as described in U.S. Pat. Nos. 3,067,482, 3,284,274, 3,100, 721, 3,180,721 and 4,927,432, the disclosures of which are incorporated herein by reference. By this process an elastomeric polymer, typically a polyurethane, is dissolved in a solvent such as N, N-dimetliylformaniide (DMF) the particulate material is dispersed in the DMF polymer solution, the viscous solution is deposited in a layer, such as on a fibrous backing substrate, and then coagulated in water, washed and dried, producing the desired cellular structure (with an outer skin that is removed, i.e. by buffing, before use to give an open cellular structure.)

The polymers useful for the polishing surface polymeric layer of the present invention have a Shore Hardness Type D number in the range of about 20 to 90, more desirably in the range of about 55 to 85; and preferably in the range of about 65–75. See ASTM Designation D2240-91, "Standard Test Method for Rubber Property—Durometer Hardness" Higher particulate content normally is used with the lower hardness polymer. The preferred range makes the best pads for polishing silicon wafers.

To achieve the superior polishing performance of the pads of the present invention, it is important that the cellular surface polishing layer of the pads be devoid, or substantially free, of non-porous fibrous material such as backing layer material. Such material interferes with the improved polishing. The polishing layer may be coagulated in-situ on a fibrous substrate, and to some extent fibrous backing layer material may extend into the polishing layer. However, it is important that the initial, and subsequent, polishing surface does not contain non-porous fibrous material. Thus, to the depth of in-use wear of the polishing layer, it should be substantially free of non-porous fibrous material. Normally this depth is in the range of at least 125 to 500 microns. Hulslander et al, U.S. Pat. No. 3,284,274 has a drawing of a pad having a polishing layer free of non-porous fibrous material.

The particulate material must be of small enough particle size not to interfere with the formation of the cell walls, which normally are from about 5–50 microns thick. For best results, the particle size, that is the average dimension of the particles, should be much less than the wall thickness. Accordingly the desired particle size is less than 2 microns, and preferably from about 0.01–1.0 microns. Particulate materials having a particle size near that of the polishing slurry to be used in polishing have proven to be highly effective.

The preferred particulate materials are inorganic material having a hardness on the Mohs scale of at least 3 and an average diameter of the particles of less than about 2 microns rendering it substantially non-abrasive to the surface being polished. Preferred inorganic particulate materials are silica, silica glass, glass ceramic, magnesium silicate, mica, calcium carbonate, cerium oxide, alumina, titania, zirconia and silicon carbide and other hard inorganic particulate materials. The most preferred particulate material is silica, such as fumed silica and other very finely divided silicas. All of the materials have Mohs Hardness of at least 3. For Mohs Hardnesses see "Handbook of Chemistry and Physics,"44th edition.

Organic particulate filler materials may also be employed alone or in conjunction with an inorganic particulate filler. The organic particulate retains its identity as a particulate dispersed in the elastomeric polymer. Such particulate material appears to modify physical properties of the pore walls. Preferred organic materials include polyurethanes, nylons acrylics, polycarbonates, polyimides, and polyesters. The criteria for selection of the organic particle is that its modulus of rigidity be substantially above that of the polymer employed to produce the surface layer of the polishing pad, and its glass transition temperature be above room temperature and be substantially above that of the polymer employed to produce the surface layer, so that the filler is a glassy elastic solid while the polymer acts as an elastomeric during use conditions.

The amount of particulate material dispersed in the elastomeric wall polymer is dependent on the amount that can be incorporated into the polymer without (1) preventing good cell wall formation and (2) greatly decreasing cell wall strength. In general, the smaller the particle size, the greater the amount of particulate material that can be used effectively. Acceptable amounts of particulate material are in the range of about 1% to 30% by weight of the combined weight of particulate material and elastomeric polymer, with about 5% to 10% giving the best results of good polishing effectiveness.

The properties of the polishing layer can be modified as desired by selecting the proper polymer, incorporating therein the proper size, type and amount of particulate material, and using the appropriate coagulating, washing and drying conditions.

The cellular elastic polymeric polishing layer or sheet, may be used as such but preferably is affixed to a backing or supporting layer to form a polishing pad. For most uses the pad substrate is a flexible sheet material, such as the conventional polishing pad non-woven fibrous backings. Other types of backing may be used, including rigid impermeable membranes, such as polyester film. Preferably the polishing layer is coagulated in-situ on the pad substrate However for some uses it may be desirable for tile pad to have an intermediate layer between the elastomeric polishing surface layer and the pad substrate, in which case the polishing layer may be coagulated on a temporary carrier film for subsequent lamination with the backing.

The function of the backing layer is primarily to serve as a vehicle for handling during processing and using the sheet material so as to prevent buckling, tearing, or applying the polishing surface in a non-uniform manner. Also the backing layer can be utilized to adjust the elastic properties of the overall polishing pad.

Referring to the drawing, in the manufacture of a preferred embodiment, flexible sheet non-woven fibrous backing layer 10 is prepared from crimped 1½ inch polyester staple fiber by conventional felting technique. Onto backing layer 10 there is deposited a viscous water/DMF solution of an elastomeric polymer containing appropriate finely divided particulate material. The backing layer carrying the viscous water/DMF solution is passed through water to coagulate the polymer in-situ affixed to the backing layer 10, and then washed with water and dried to remove residual DMF. The polymer coagulates into an open elongated cellular structure having an outer skin thereon. The outer skin is removed by conventional buffing, leaving a polishing layer 11 of open cellular structure that is substantially free, at the polishing surface 14, of non-porous fibrous material. The walls 12 of the cells have finely divided silica particles 13 dispersed therein. Thus the initial and subsequent polishing surfaces 14 are substantially free of non-porous fibrous material.

In use, in accordance with the method of the present invention, the present invention polishing pad is mounted on the platen of a conventional polishing machine, such as a "Siltec" 3800 manufactured by Cybeq Corp. One or more hard surfaces to be polished, such as stock polished textured surface silicon wafers, are mounted on the machine. The rotating polishing pad is brought into pressure contact with the surfaces of the wafers and rotated, while a liquid polishing medium is fed to the polishing pad in the conventional manner. Normally the polishing medium is an aqueous slurry. When using a pad of the present invention superior polishing is achieved, giving a surface with less observable texture.

EXAMPLE 1

Preferred polishing pads of the present invention are prepared as follows. A liquid polymer surface layer formulation for pads is prepared having the following composition weight percentages:

TABLE 1

| Polymer Formulation | |
|---|---|
| Polyurethane[1] | 12% |
| Fumed silica[2] | 1% |
| DMF | 87% |

[1]"Texin" 970D manufactured by Miles, Inc.
[2]Primary particle size 0.02–0.04 micron To prepare the formulation 272 lbs, or 34.34 gallons, of DMF are poured into a mixer. With mixing, 48 lbs. of polyurethane chips are slowly added to the DMF. With mixing, the mixture is heated to 170° F. for 5 hours, after which the polyurethane chips are completely dissolved. In a separate container 4 lbs. of the fumed silica is added to 75 lbs., or 9.5 gallons, of DMF. This mixture is then added to the polyurethane/DMF solution, mixed for 1 hour, cooled to 100° F. and filtered into a tank The formulation is then degassed. The final formulation has a viscosity of 1950 cps at 25° C.

A conventional polishing pad backing, or substrate, layer is then coated with the polishing layer formulation. The backing layer is a 60 inch wide 40–60 mils thick non-woven polyester staple fiber felt material impregnated with polyurethane. During coating the concentration and temperature of the coagulation bath are 15% DMF (in water) and 62° F., respectively. The formulation temperature is 62° F. The backing layer is dried in an oven at 190° F. for 20 minutes. The polishing layer formulation is coated thereon as the backing layer passes over a feed roll at a speed of 10 feet per minute. The polishing layer formulation is applied evenly across the surface of the backing layer, at rates of somewhat over 1 gallon per minute. This gives 16 to 22 mils thick coatings of wet formulation. The coated backing is then run through a water bath followed by washing and drying to produce the final polishing layers in-situ on the backing layers.

The polishing layers after coagulation, washing and drying have a polyurethane surface skin that is removed by buffing. The bottom surfaces of the backing layers are also buffed to achieve desired pad thickness.

The polishing pad materials so produced comprises flexible non-woven elastomeric impregnated backing layer, and affixed thereon elastomeric polymer polishing layer having an open cellular structure substantially free of non-porous fibrous material adjacent the polishing surface, the walls of the cellular structure containing finely divided silica particles.

The average dimensions of these polishing pad materials prepared as described are 54 mil pad thickness and about 14 mil pore height. Polishing pads of the desired size are cut from these polishing pad materials.

EXAMPLE 2

This example is the practice of a preferred embodiment of the present invention method of polishing. Silicon wafers are polished using the polishing pads prepared in Example 1. Circular polishing pads 36" in diameter are cut from the polishing pad material. Stock polished silicon wafers are used as the surfaces to be given the final polish.

In the polishing test, which exemplifies the practice of the present invention method, Example 1 pad; are tested using a single pad to polish six runs on the wafers received from the first stock removal stage. Each run polishes 12 wafers; a total of 72 wafers are polished with a single pad from each lot. The 24 wafers from the first two runs of each polishing pad lot are not included in the polishing data compilations.

The Example 1 polishing pads are mounted on a standard polishing machine, rinsed with de-ionized water and scrubbed with a nylon brush for 1 minute to wash out any imbedded foreign particles. This cleaning procedure is done after each polishing run. Table 2 lists the parameters of the present invention method tests.

TABLE 2

| Final Polishing Stage Parameters | |
|---|---|
| Polishing slurry | LS10[3] |
| Slurry dilution/pH | 13:1/pH 10.30 |
| Slurry flow rate | 400 ml/min |
| Platen speed | 60 rpm |
| Quill speed | 60 rpm |
| Polishing pressure | 6.42 psi |
| Polishing time | 5 minutes |
| Rinse pressure | 6.42 psi |
| rinse time | 15 seconds |
| Platen cooling setting | 7 L/min |

[3]Made by Rodel, Inc.

A Nomarski microscope 50X magnification photograph of the surface of wafers after the stock polishing stage, before the final polish stage, shows a clearly visible rough textured surface of the wafers before being polished in accordance with the present invention. Similar photomicrographs of the silicon wafers after final polishings show no observable surface texture.

EXAMPLE 3

This example compares the aforementioned polishing results obtainable using present invention polishing pads with prior art polishing pads. The "UR-100" pads are used to polish stock polished silicon wafers, substantially as described in Example 2. ("UR-100" polishing pads are prior art made by Rodel, Inc. that contain carbon but contain no silica or other filler material in the polyurethane polishing layer). LS 10 polishing slurry at a 13:1 dilution, pH 10.3 is used. Conditions of polishing are adjusted to give optimum polishing for the "UR-100" pads. It should be noted that prolonged polishing times do not improve the polishing results. A Nomarski microscope photomicrograph of the surface of a wafer polished by the "UR100" prior art polishing pad shows clearly observable surface texture. Notwithstanding, this typifies the results of present state of the art polishing. In contrast, photomicrographs of wafer surfaces afer similar polishing using present invention polishing pads show no visible surface texture.

EXAMPLE 4

Following the procedure of Example 1, polishing pads of the present inventions are made. The liquid DMF polymer surface layer formulations are of the same composition (by weight percentage) as in Example 1 except that a variety of particulates at different concentrations are employed.

TABLE 3

| Polymer | | Inorganic Particulate | |
|---|---|---|---|
| Type | Hardness[4] | Type[5] | Amount[6] |
| Polyetherurethane | 30 | Silica | 20 |
| Polyetherurethane | 85 | Silica | 5 |
| Polyesterurethane | 70 | Alumina | 10 |
| Polyetherurethane | 70 | Silica | 7 |
| Polyesterurethane | 70 | Silica | 7 |
| Polyesterurethane | 50 | Zirconia | 10 |
| Polyesterurethane | 65 | Ceria | 12 |
| Polyesterurethane | 75 | Titania | 25 |
| Polyetherurethane | 60 | Silicon Carbide | 15 |
| Polyetherurethane | 70 | Calcium Carbonate | 12 |
| Polyetherurethane | 85 | Mica | 15 |
| Polyetherurethane | 55 | Magnesium Silicate | 30 |
| Polyesterurethane | 70 | Glass Beads | 10 |

[4]Shore D hardness
[5]Average dimension between 0.01 and 2.0 micron: Mohs scale hardness over 3
[6]% by weight of polymer plus particulate material Using these polishing pads in accordance with the procedure of Example 2, good to excellent final polish results are obtained.

EXAMPLE 5

Following the procedure of Example 1, polishing pads of the present inventions are made. The liquid DMF polymer surface layer formulations are of the same composition (by weight percentage) as in Example 1 except that a variety of particulates at different concentrations are employed.

TABLE 4

| Polymer | | Organic Particulate[7] | |
|---|---|---|---|
| Type | Hardness[8] | Type[9] | Amount[10] |
| Polyesterurethane | 70 | "Lexan" 203[11] | 6 |
| Polyesterurethane | 30 | "Isoplast" 301[12] | 25 |
| Polyesterurethane | 60 | "Capron" 8254 HS[13] | 15 |
| Polyesterurethane | 80 | Polymethylmethacrylate | 10 |
| Polyesterurethane | 55 | "Ultradur" B255[14] | 12 |
| Polyetherurethane | 50 | "Aurum" 450[15] | 18 |

[7]Glass transition temperature above room temperature and substantially above that of the particular "Polymer."
[8]Shore D Hardness
[9]Average dimension between 0.01 and 2.0 micron
[10]Percent by weight of polymer plus particulate material
[11]Polycarbonate made by General Electric Corporation
[12]Polyurethane made by Dow Chemical Company
[13]Nylon 6 made by Allied Signal
[14]Polyester made by BASF
[15]Polyimide made by Mitsui Toatsu Using these polishing pads in accordance with the procedure of Example 2, good to excellent final polishing results are obtained.

I claim:

1. A polishing pad comprising:

a backing layer and affixed to the backing layer a polishing layer consisting essentially of an elastomeric polymer having a polishing surface and an open elongated cellular structure including cells which are separated by walls at the polishing surface, the elastomeric polymer being substantially free of non-porous fibrous material adjacent the polishing surface, the walls containing finely divided particulate material having a modulus of rigidity greater than that of the elastomeric polymer and having a hardness of at least 3 on a Mohs scale, wherein the polishing layer contains 1–30% by weight, based on the combined weight of the particulate material and the elastomeric polymer, of finely divided particulate material having an average dimension in the range of 0.01 to 1.0 micron, and the particulate material is selected from the group consisting of silica, alumina, zirconia, ceria, titania, silicon carbide, calcium carbonate, mica, magnesium silicate, glass beads, and combinations thereof; and wherein said elastomeric polymer has a Shore D Hardness in the range of about 20–90, and said cellular structure is substantially free of non-porous fibrous material for a depth of at least 125 microns.

2. The polishing pad of claim 1 in which the polishing layer contains about 5–10% by weight of finely divided particulate material.

3. The polishing pad of claim 1 in which the elastomeric polymer has a ShoreD hardness in the range of about 55–85.

4. The polishing pad of claim 1 in which the elastomeric polymer has a ShoreD hardness in the range of about 65–75.

5. The polishing pad of claim 1 in which the particulate material is silica.

6. The polishing pad of claim 1 in which the particulate material is fumed silica.

7. The polishing pad of claim 1 in which the particulate material further comprises organic particulate material selected from the group consisting of polyurethanes, polyamides, acrylics, polycarbonates, polyimides and polyesters.

* * * * *